Nov. 13, 1962
T. H. FIKSE
3,063,758
STRUNG SECTION FLEXIBLE BAND VEHICLE TRACK
Filed Aug. 26, 1960
10 Sheets-Sheet 1
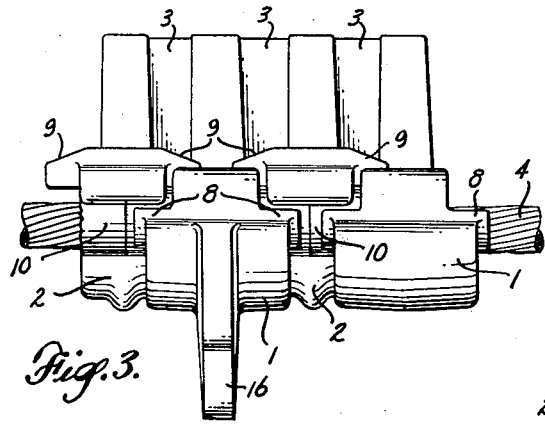
Fig. 3.
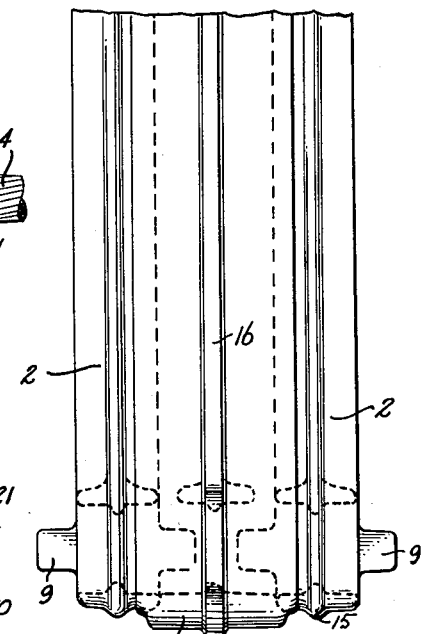
Fig. 4.
Fig. 2.
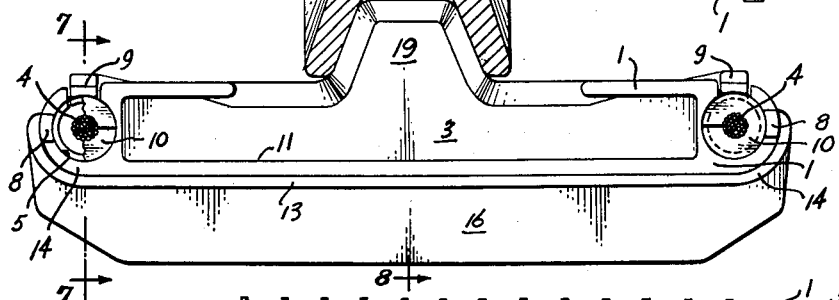
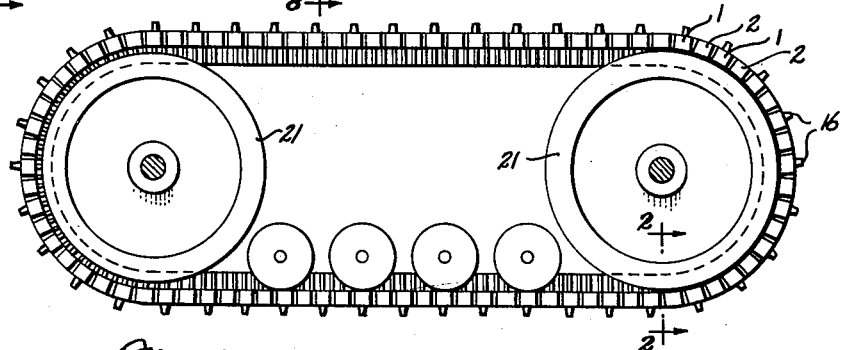
Fig. 1.
INVENTOR.
TYMAN H. FIKSE
BY
*Robert W. Beach*
ATTORNEY

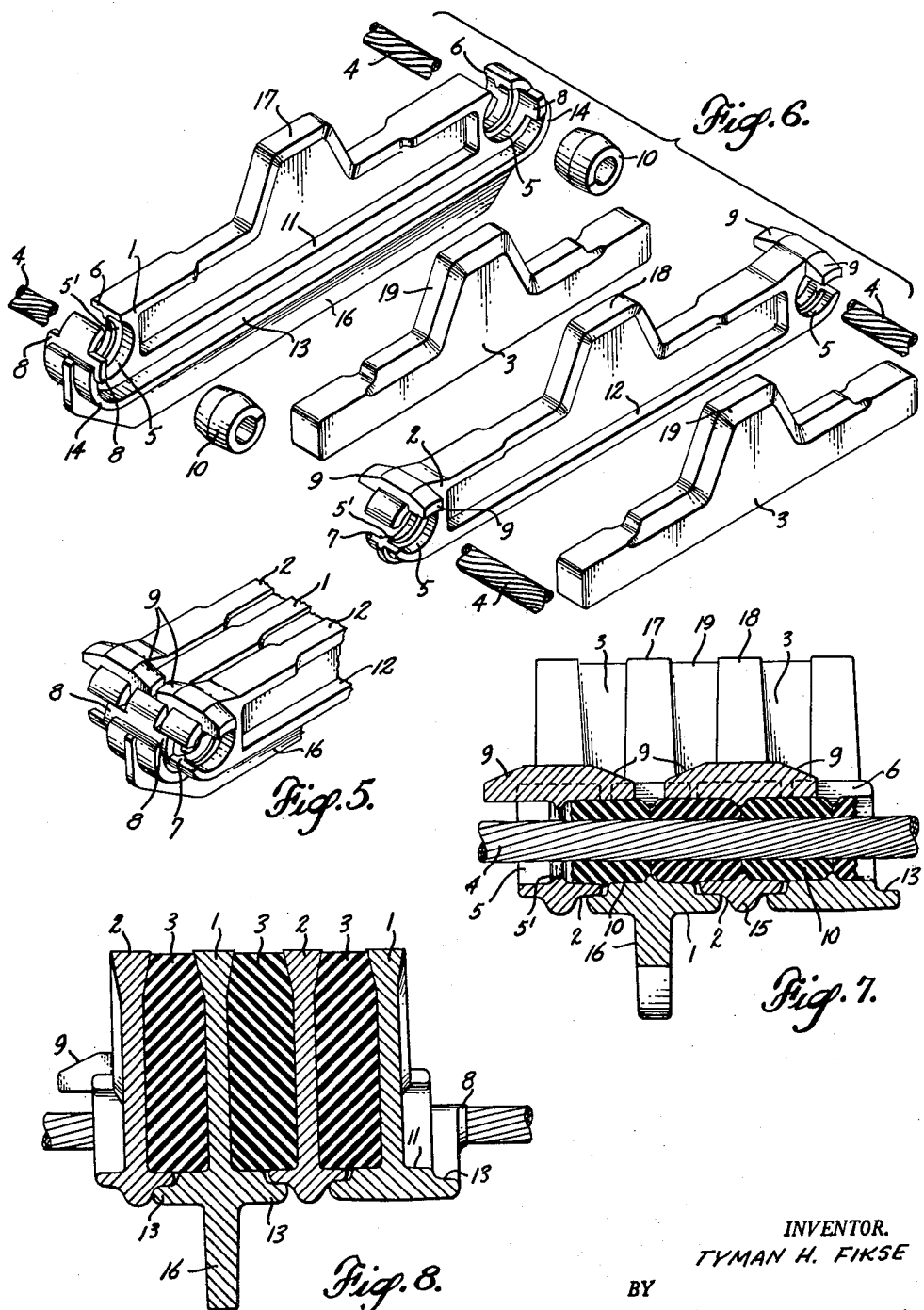

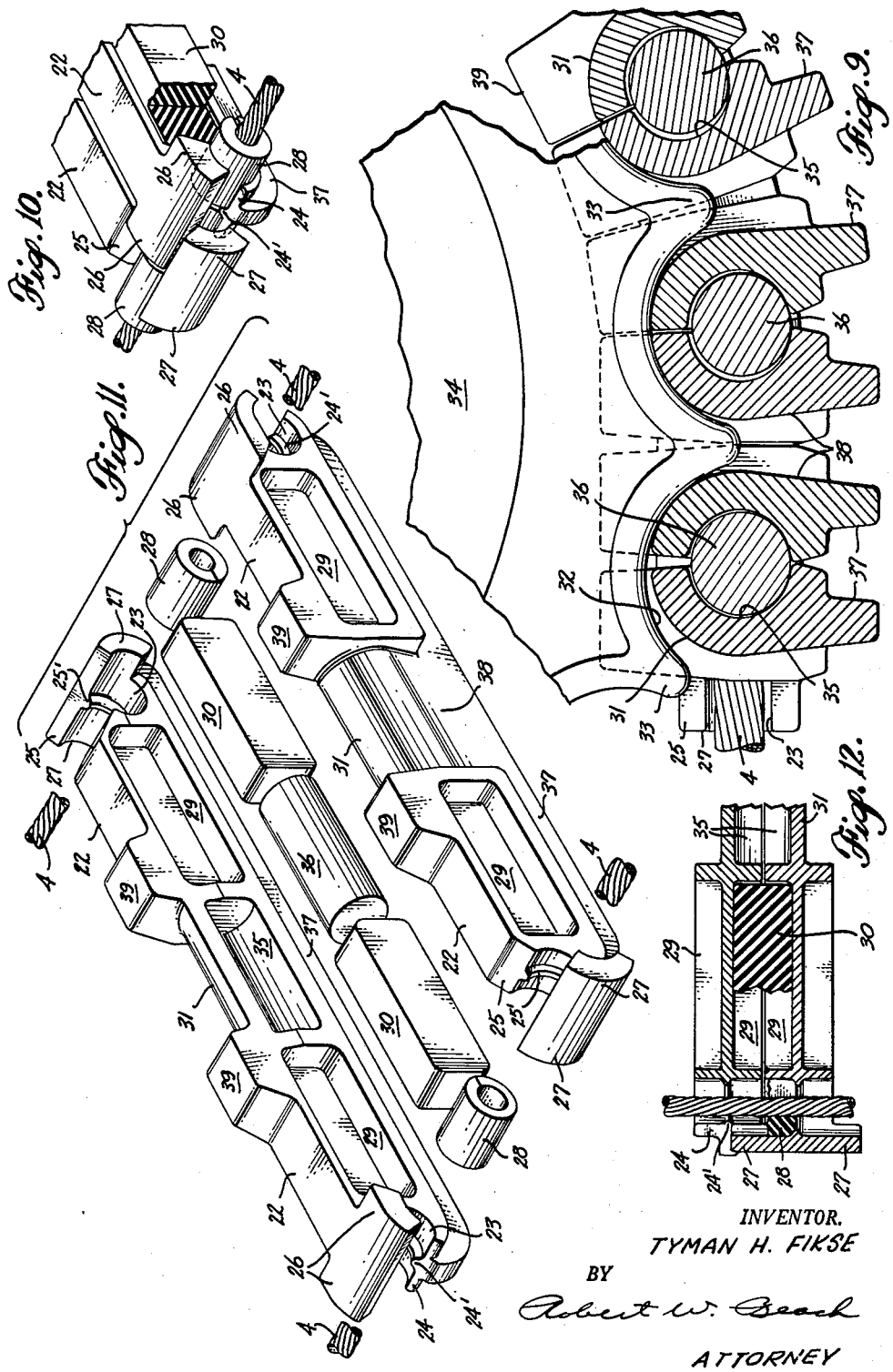

Nov. 13, 1962     T. H. FIKSE     3,063,758
STRUNG SECTION FLEXIBLE BAND VEHICLE TRACK
Filed Aug. 26, 1960     10 Sheets-Sheet 4

INVENTOR.
TYMAN H. FIKSE
BY
ATTORNEY

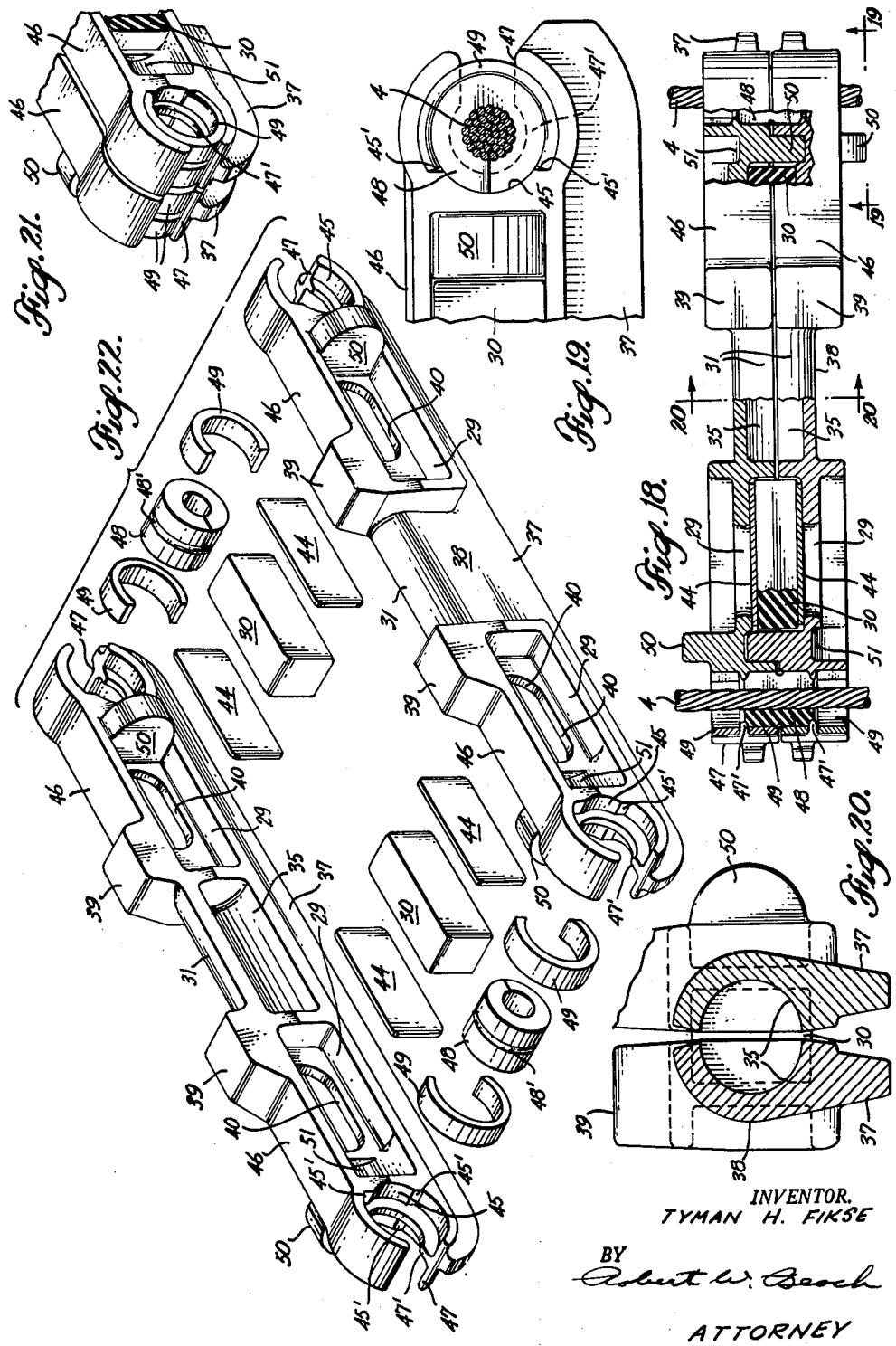

Nov. 13, 1962 T. H. FIKSE 3,063,758
STRUNG SECTION FLEXIBLE BAND VEHICLE TRACK
Filed Aug. 26, 1960 10 Sheets-Sheet 6
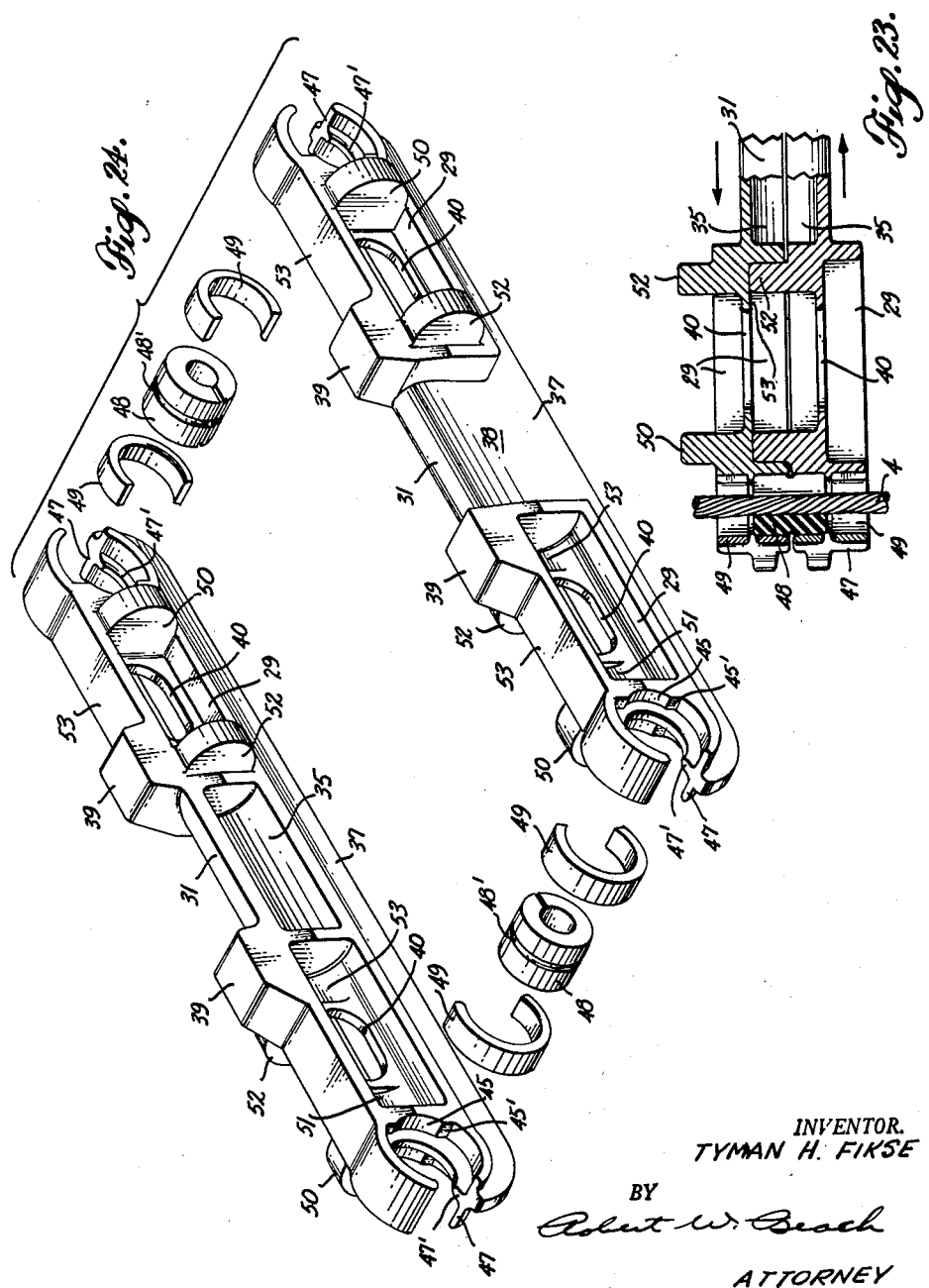
INVENTOR.
TYMAN H. FIKSE
BY
ATTORNEY

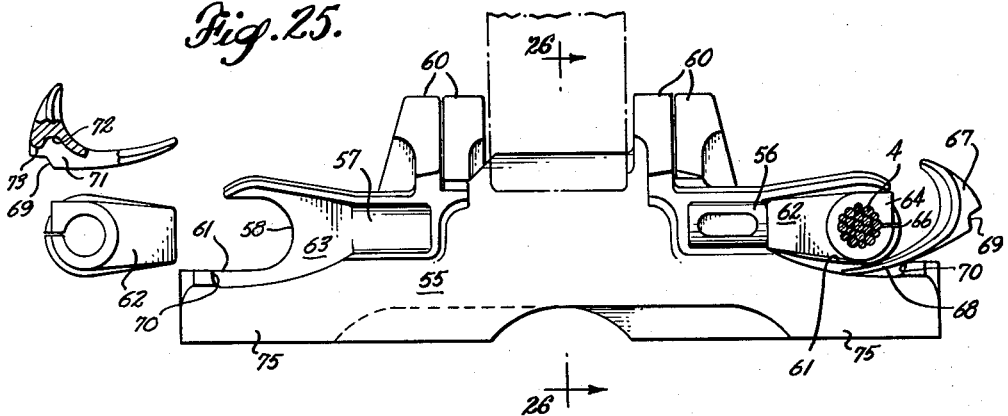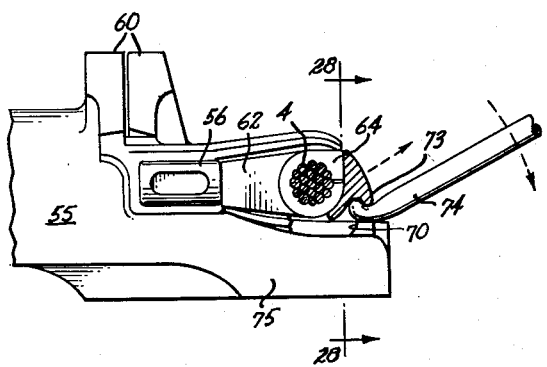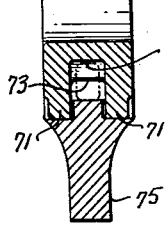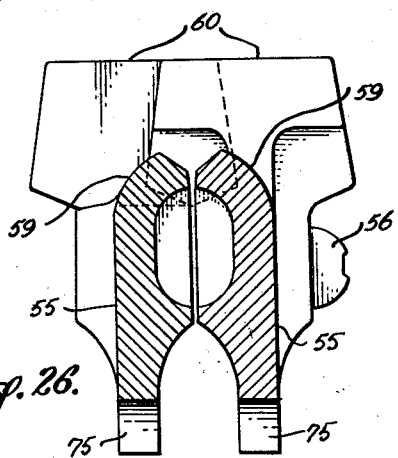

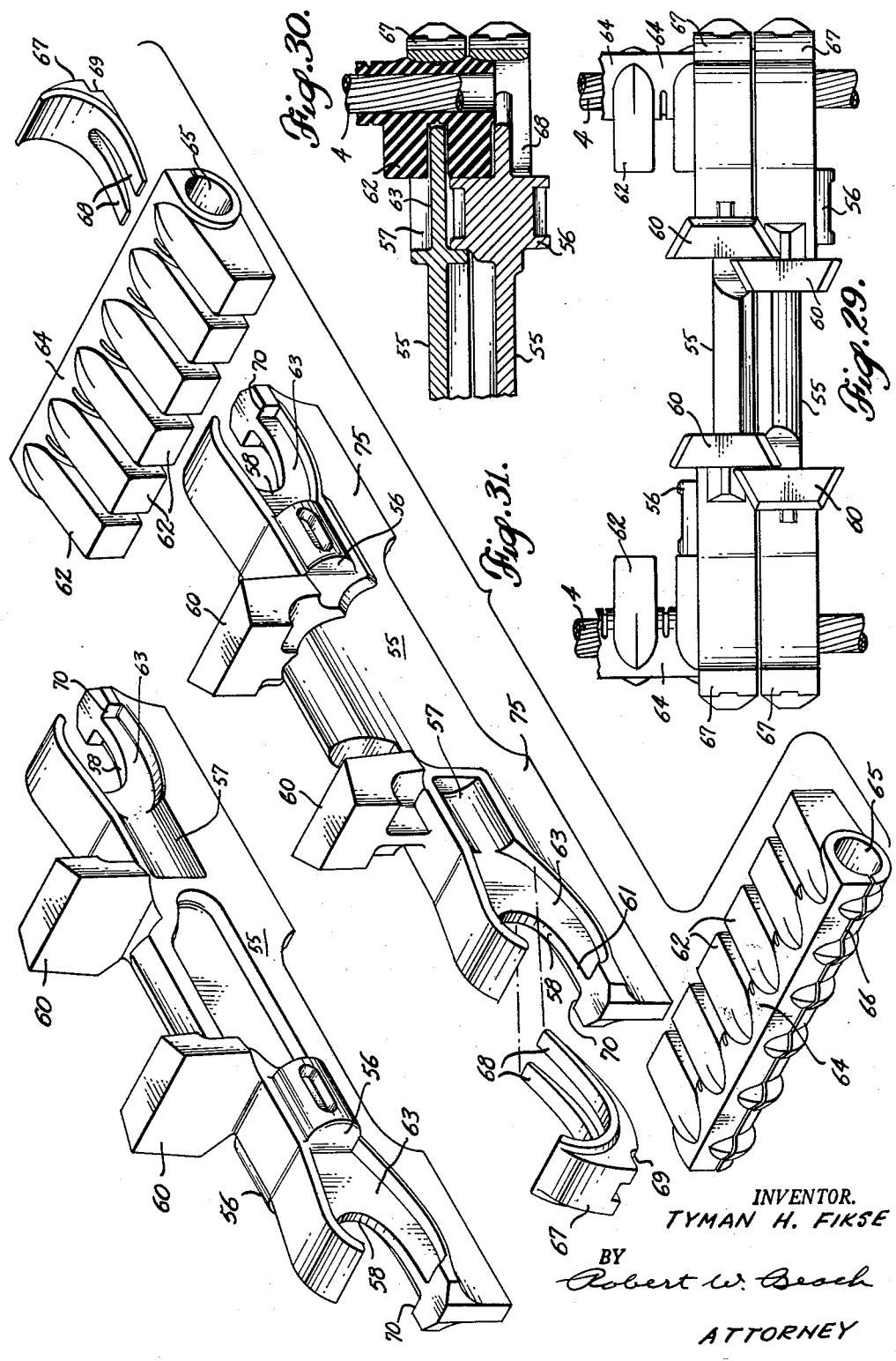

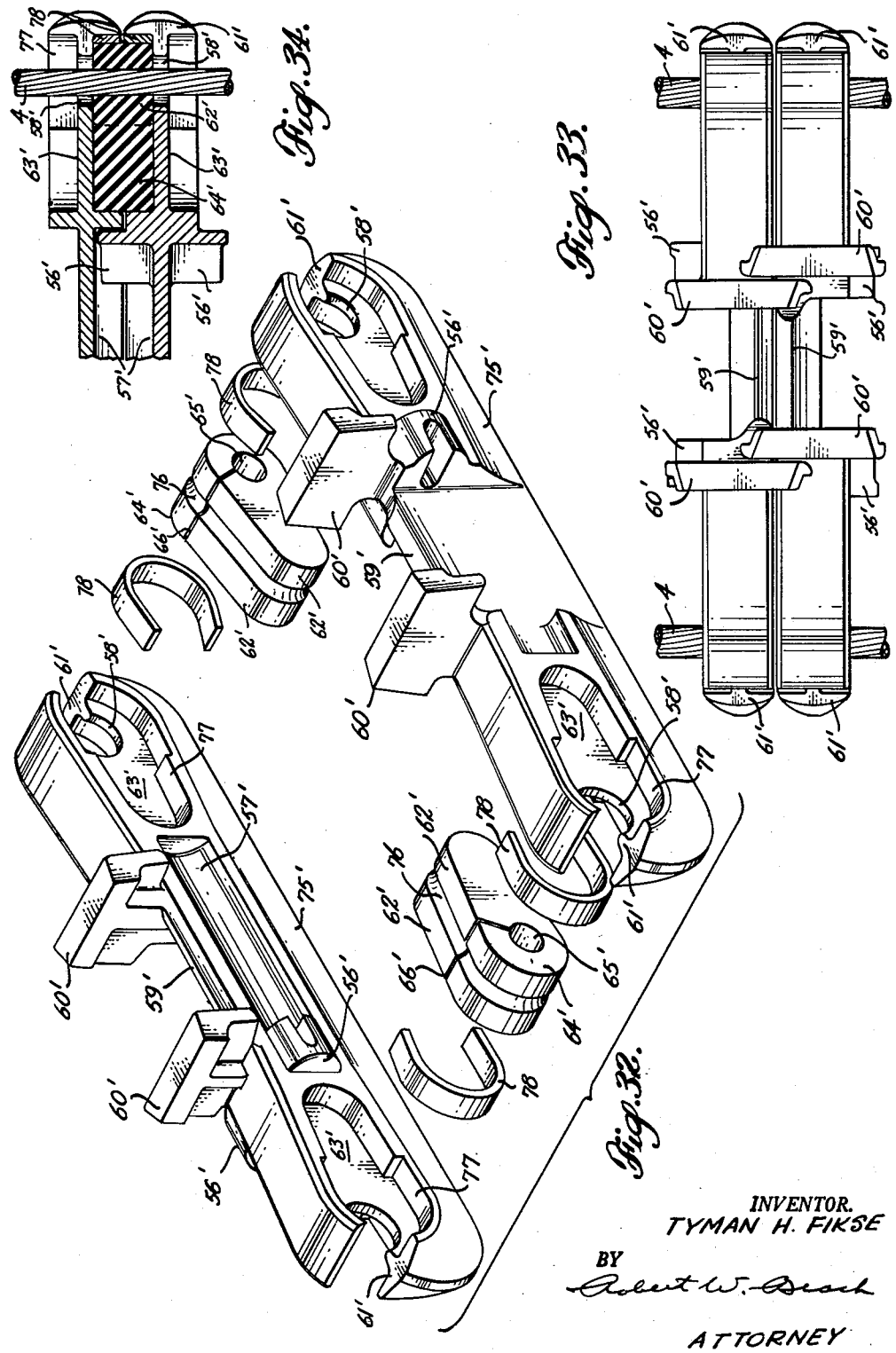

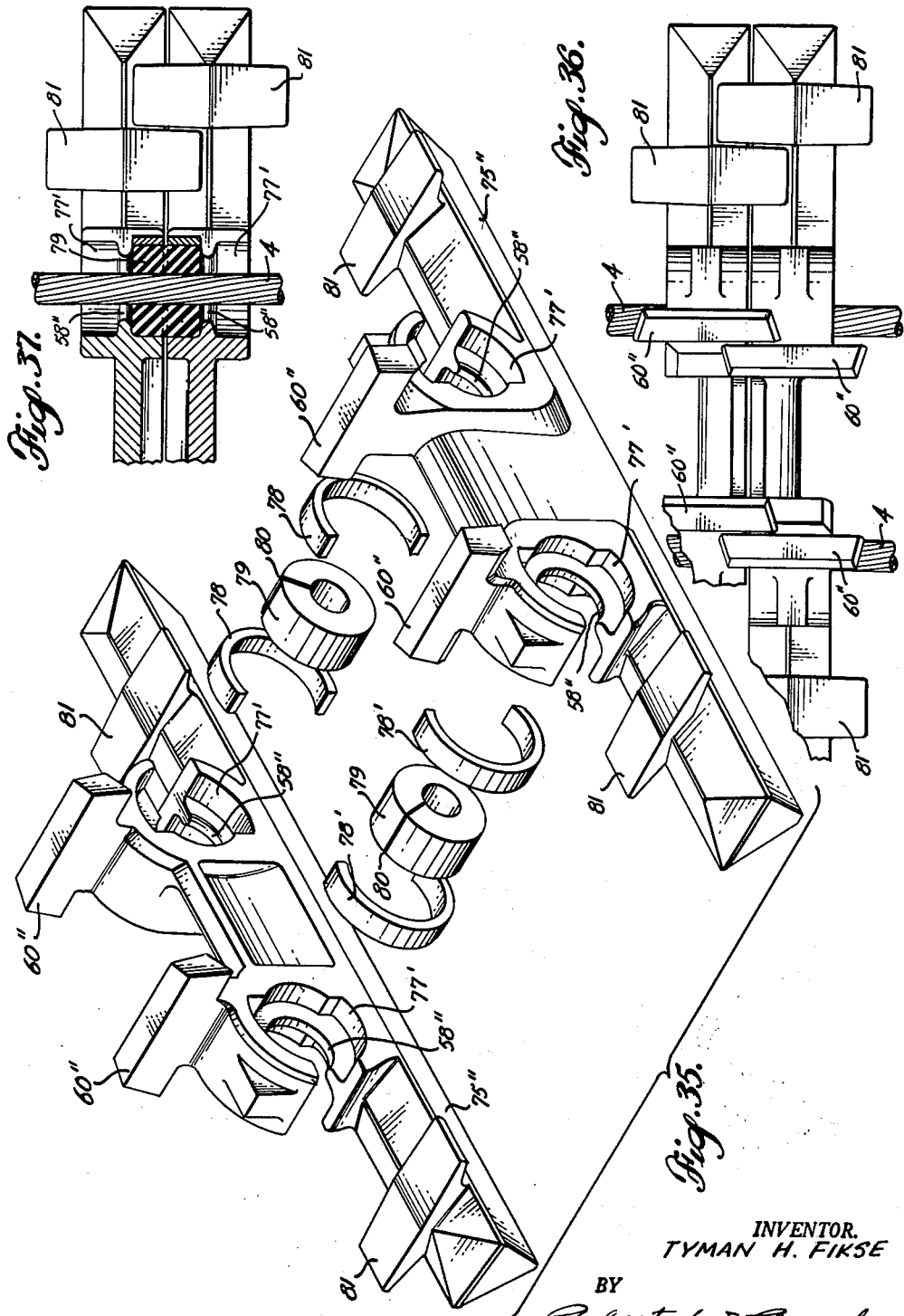

United States Patent Office 3,063,758
Patented Nov. 13, 1962

3,063,758
STRUNG SECTION FLEXIBLE BAND VEHICLE
TRACK
Tyman Harold Fikse, 14434 6th Ave. S.,
Seattle 88, Wash.
Filed Aug. 26, 1960, Ser. No. 52,220
46 Claims. (Cl. 305—40)

The present invention relates to a flexible band vehicle track which is composed of individual track sections strung on cable loops. This application is a continuation-in-part of my copending patent application Serial No. 845,734, filed October 12, 1959, now abandoned, for Strung Section Fexible Band Vehicle Track.

A principal object is to provide such a band track which will be much less subject to wear than the usual flexible band type vehicle track and, consequently, will have a much longer life.

An additional object is to construct such a vehicle track so that it will be much quieter in operation than the usual track.

In accomplishing these objects, a track design is utilized having track sections which are much shorter than usual in a direction circumferentially of the track, so that the angular displacement or relative tilt between adjacent sections of the track as they move around the supporting end wheel or sprocket is much less than normal. Use of such shorter track sections increases the wear life of such a track and reduces the noise which it makes in moving around the supporting wheels during operation. By providing resilient elements, preferably of elastomer material, engaged between adjacent track sections to prevent their direct contact, the track noise is further reduced.

Not only is the wear life of such a track greatly increased, but the life of cooperating parts, such as drive gear or wheels, idler rollers or wheels, and bearings, is also substantially lengthened.

Despite the advantages obtained by using the present track, such track is more economical to manufacture because it does not require precision parts and machining is therefore reduced to a minimum or eliminated altogether.

The operation of a vehicle equipped with band tracks, according to the present invention, is also more economical because friction is reduced and the power required to operate the vehicle is correspondingly less.

Additional objects include providing a track construction which, while having much less tendency to wear, can be altered relatively easily and economically to compensate for such wear as may occur.

Moreover, the operation of a track of the present invention is more satisfactory because movement of the track tends to release dirt which might otherwise be inclined to pack between its cleats or grousers while, at the same time, soft earth beneath the tracks tends to be compacted. The speed of operation of the track can be higher than practical for tracks of other types and, because of the more accurate engagement between the track and its supporting wheels, there is less tendency for the track to be displaced from such wheels under heavy load.

In general, the track structure includes two endless cable loops in registry in parallel planes which are interconnected by a plurality of track sections. Such track sections are strung on the cables and held in registry transversely of the cables by registering means spanning between adjacent track sections. Preferably also, elastomer spacer members bridge between adjacent track sections and cushion the relative tilting of such sections as they move around a supporting wheel. Such spacer members also prevent or reduce engagement of adjacent track sections which minimizes wear and noise of track movement.

FIGURE 1 is a side elevation view of a mounted track according to the present invention, and FIGURE 2 is an enlarged cross-sectional view through the track taken on line 2—2 of FIGURE 1.

FIGURE 3 is an edge elevation view of a portion of the track, and FIGURE 4 is a fragmentary face view of the track.

FIGURE 5 is a top perspective view of end portions of track sections in a group, and FIGURE 6 is a top perspective view of a plurality of track sections and interposed spacer members shown in exploded relationship.

FIGURE 7 is a vertical sectional view through a group of track sections taken on line 7—7 of FIGURE 2, and FIGURE 8 is a similar view taken on line 8—8 of FIGURE 2.

FIGURE 9 is a central vertical sectional view through a portion of a different type of vehicle track. FIGURE 10 is a top perspective view of the end portions of a plurality of assembled track sections of the type shown in FIGURE 9 with parts broken away, and FIGURE 11 is a top perspective view of track sections and related components for the same type of track shown in exploded relationship.

FIGURE 12 is a longitudinal sectional view through end portions of track sections of the same type of track taken parallel to the cable.

Figure 13:
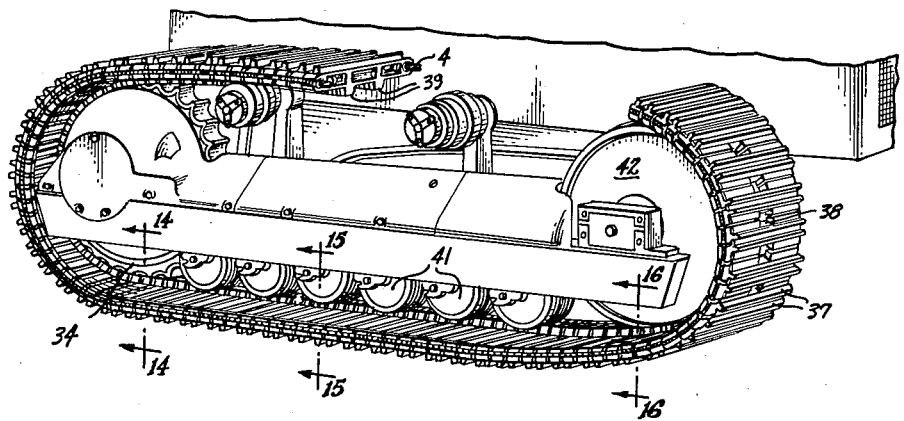
FIGURE 13 is a perspective view of a vehicle track on the same type of construction mounted on a vehicle with parts broken away.
Figure 14:
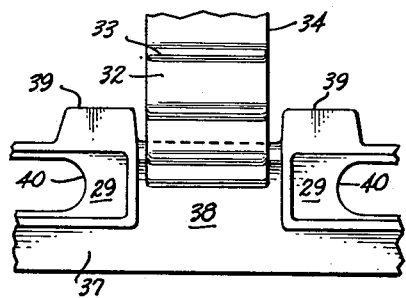
Figure 15:
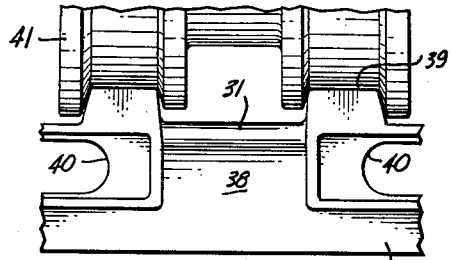
Figure 16:
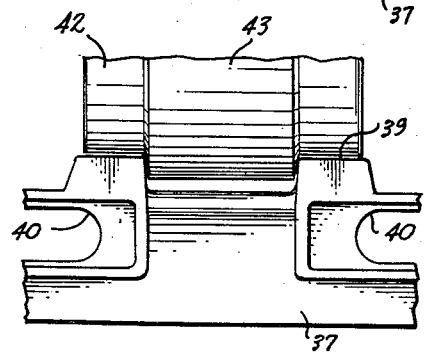

FIGURE 14 is a fragmentary sectional view through the track taken on line 14—14 of FIGURE 13, FIGURE 15 is a fragmentary sectional view through the track taken on line 15—15 of FIGURE 13, and FIGURE 16 is a fragmentary sectional view through the track taken on line 16—16 of FIGURE 13.

Figure 17:
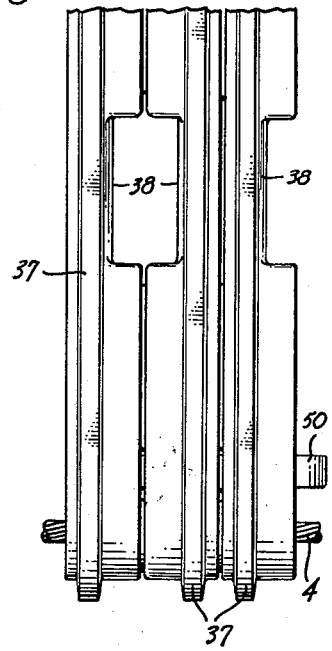

FIGURE 17 is a face view of a portion of the track shown in FIGURE 13.

FIGURE 18 is an innerface view of a pair of adjacent track members of still a different type with parts broken away. FIGURE 19 is a fragmentary sectional view through the track taken on line 19—19 of FIGURE 18. FIGURE 20 is a sectional view taken longitudinally of the track on line 20—20 of FIGURE 18.

FIGURE 21 is a top perspective view of end portions of track sections in assembled relationship, and FIGURE 22 is a top perspective view of track sections and related components in exploded relationship.

FIGURE 23 is a fragmentary edge view of still a different type of track, with parts broken away, and FIGURE 24 is a top perspective view of track sections and related components of the same type of track in exploded relationship.

FIGURE 25 is a transverse section through another modified type of track showing a track section and its related parts in elevation, and FIGURE 26 is a sectional view on line 26—26 of FIGURE 25.

FIGURE 27 is a transverse sectional view through half of the track, corresponding to FIGURE 25 but with parts broken away, and FIGURE 28 is a sectional view taken on line 28—28 of FIGURE 27.

FIGURE 29 is a plan view of interlocking track sections shown in assembled relationship with adjacent parts broken away, and FIGURE 30 is a longitudinal sectional view through one end of such assembled track sections.

FIGURE 31 is a top perspective exploded view of two track sections and cooperating parts of the same type of track.

FIGURE 32 is a top perspective exploded view of a further type of interlocking track sections and related parts. FIGURE 33 is a plan view of such track sections in assembled relationship and FIGURE 34 is a longitudinal sectional view through one end portion of such track sections in such relationship.

FIGURE 35 is a top perspective exploded view of still a different type of interlocking track sections and related parts. FIGURE 36 is a plan view of such interlocking track sections in assembled relationship, parts being broken away, and FIGURE 37 is a longitudinal sectional view through an end portion of such assembled track sections.

The vehicle track of the present invention in the several forms illustrated in the drawings is composed of track sections strung on endless cable loops disposed in registry in spaced parallel planes. Such a complete track is shown in FIGURE 1 as composed of the strung sections 1 and 2. It will be noted in FIGURE 1 that such sectionss are arranged alternately, as shown in greater detail in FIGURES 2, 3 and 4. Between these track sections are located elastomer spacer members 3 which bridge between the adjacent track sections. The profile of such a spacer member is shown in FIGURE 2. The track sections 1 and 2 are strung on the endless cable loops 4, preferably two in number, and such cable loops are interconnected by the track sections to maintain them in spaced parallel planes, although a single cable loop might be enough.

In order to insure that the individual components of the track structure cannot become separated, it is preferred that the track sections actually be strung on the cables 4 rather than simply engaging such cables. At the same time, it is preferred that the track sections be formed as independent components so that they can be assembled with cable loops of different lengths to form tracks of different size. Also, the tightness of stringing the sections can be altered by varying the number of track sections strung on the cable loops of a given length. By using preformed individual track sections worn or damaged sections can be replaced selectively without replacing the other sections.

Since the cable loops 4 on which the track sections are strung preferably are endless, it is not possible to thread the cables through apertures in the track sections in assembling the track. Consequently, the cables 4 are inserted into the apertures 5 in the opposite ends of each track section, respectively, by movement of each portion of the cable transversely of its length through an access slot communicating with an aperture 5 in each instance. The track sections 1 and 2 differ in the arrangement of their access slots. As shown in FIGURES 2, 3, 5 and 6, the track sections 1 have access slots 6 at the inner sides of their end portions which communicate with the cable-receiving apertures 5. The alternate track sections 2, on the contrary, have access slots 7 communicating with their cable-receiving apertures 5 which open at the ends of such track sections. The reason for such relative angular displacement between the access slots for adjacent sections is to lock the cable securely in the cable-receiving apertures when the track sections are disposed in adjacent relationship.

While it would be extremely unlikely that the cable could escape from the cable-receiving apertures 5 in the track sections through the access slots 7 when such access slots in adjacent track sections are angularly displaced as described, the track sections may be constructed to provide an additional safeguard to prevent escape of the cable from such apertures. Preferably, as shown in FIGURES 3, 5 and 6, the end portions of adjacent track sections also have slot-closing lugs projecting parallel to the axes of the cable-receiving apertures and adjacent to such apertures. Such a lug on each track section is located circumferentially of the cable-receiving aperture of its track section in a position corresponding to the location of the access slot of an adjacent track section.

Thus each track section 1 has lugs 8 projecting from the opposite sides of its end portions, which lugs are located at the ends of such track sections in positions corresponding to the end access slots 7 in the adjacent track sections 2. Correspondingly, the track sections 2 have lugs 9 projecting oppositely from the inner sides of their end portions alongside the cable-receiving apertures in positions corresponding to the access slots 6 of the adjacent track sections 1. When the track sections 1 and 2 are assembled in side-by-side relationship, as shown in FIGURE 5, therefore, the lugs on the adjacent track sections will interlock and block the access slots as shown in FIGURE 5. Thus, the lugs 9 of track sections 2 on the opposite sides of a track section 1 extend toward each other at the inner side of the track sections to block the access slot 6 at the inner side of the intermediate track section 1. The oppositely extending lugs 8 of the intermediate track section 1, on the other hand, block the adjacent portions of the end access slots 7 in the adjacent track sections 2.

While the apertures 5 of the track sections could be made of a size to embrace closely the portions of the cable 4 passing through them, it is preferred that the cable be prevented from being chafed by working of the track sections as the track band moves circumferentially. Consequently, thimbles of relatively soft, wear-resistant elastomer material are provided encircling the cable and received within the track section apertures 5. These thimbles may be of material such as neoprene, which is resistant to deterioration by oil and grease. To facilitate application of the thimbles to the cable, such thimbles 10 are split as shown in FIGURE 6 so that such splits can be spread and the thimbles fitted on the cables by movement transversely of the length of the cables. The resilience of the thimbles will then close the slits so that the thimbles will fit snugly around the cable. Such thimbles are shown assembled on a cable 4 in FIGURE 7.

It is preferred that each of the cable-receiving apertures 5 have a central peripheral rib 5' against which the ends of the thimbles 10 can abut. Such ribs will insure that the thimbles cannot move axially through the apertures 5. Also, it is preferred that the thimbles be of an outside diameter slightly less than the inside diameter of the apertures 5 so that the thimbles may be slid easily along the cable fully into such apertures. It is also preferred, however, that the axial width of each thimble be slightly greater than the axial extent of an aperture 5 so that the sleeve will bridge between the adjacent track sections in the apertures of which it is fitted and can be squeezed axially by movement of such track sections toward each other to distend the thimble radially so that it will fit tightly around the cable and will be pressed against the walls of the apertures in which it is received. Each thimble will thus be secured tightly in place and, if its split is at the side nearer the center of the track section, the thimble cannot rotate so that its split might move into registry either with an access slot 6 of a track section 1 or an access slot 7 of a track section 2.

As mentioned above, spacer members 3 of elastomer material are disposed between adjacent track sections to prevent direct contact of their principal surfaces. It is preferred, however, that the track sections 1 and 2 be disposed quite close together in their assembled relationship, and if the spacer members were merely of a thickness corresponding to the minimum distance between the track sections, such spacer members would be so thin as to be quite flimsy and fragile and to have little cushioning effect. Consequently, the track sections 1 have recesses 11 at their opposite sides, and track sections 2 have recesses 12 at their opposite sides of a size and shape corresponding to the profile shape of the spacer members 3 so as to receive the opposite sides of such spacer members. Each of the recesses 11 and 12 is of a depth slightly less than half the thickness of a spacer member so that the track sections at opposite sides of such a spacer member can be pressed firmly toward each other to squeeze the spacer member between them without the margins of such recesses contacting.

Despite the fact that the track sections are interconnected by the cable loops 4 and both the thimbles 10 and the spacer members 3 of elastomer material bridge between adjacent track sections, the load on the track may be so great that it is undesirable for stresses created by concentrated loads to be transmitted from one track member to the adjacent track members through such cables, thimbles and spacer members. Consequently, the track sections are provided with registering means which interengage to resist relative displacement of adjacent track sections transversely of the lengths of the cable portions connecting such sections and such registering means will transmit stresses between the track sections in shear.

In the type of track shown in FIGURES 1 to 8, inclusive, such registering means includes flanges 13 projecting oppositely from opposite sides of the track section 1 along its outer margin. These flanges overlap the adjacent edge portions of the adjacent track sections 2, as shown in FIGURES 7 and 8. Any concentrated upward load exerted on the bottom of a track section 1 would thus be transmitted to both adjacent track sections 2 on opposite sides of such track section 1 through such flanges. Also it is preferred that the opposite ends 14 of the flanges 13 extend transversely from the linear portions of such flanges so as to prevent appreciable relative movement of adjacent track sections parallel to the principal portions of flanges 13 and transversely of the cables.

To strengthen the track sections 2 it is preferred that they have an external rib 15 extending centrally along the outer edge and projecting substantially flush with the outer sides of flanges 13 of track section 1 when the track sections are in their assembled relationship shown in FIGURES 7 and 8. Also, for most uses it is desirable to provide grousers or cleats 16 on at least some of the track sections. While such grousers could be provided on such track section, they should at least be provided on every third section. The width of these grousers should be sufficient to afford an adequate width of penetration down into the ground over which the track moves.

While the adjacent track sections are constructed in the manner described above to limit relative shifting of the track members, it is necessary to fashion the track as a whole so that it can be guided by wheels or sprockets of a vehicle on which the track is mounted, both for supplying power to move the track and to retain the track as a whole in a predetermined lateral relationship to such wheels or sprockets which the track engages. For this purpose each of the track sections 1 shown in FIGURES 1 to 8, inclusive, has an inwardly directed and tapered projection 17, and each track section 2 has a corresponding inward projection 18. The elastomer spacer members 3 also have inward projections 19, which are received and squeezed between the projections 17 and 18 of the track sections 1 and 2 when they are strung on the cable loops 4. When the track is assembled, therefore, the track section projections 17 and 18 and the intermediate spacer member projections 19 cooperate, as shown in FIGURES 7 and 8, to form virtually a continuous rib along the inner side of the track.

The composite rib formed by the track section projections 17 and 18 and the spacer member projections 19 tapered inwardly can engage grooves 20 in wheels 21, as shown in FIGURES 1 and 2, about which the track band extends. It will be evident that such engagement of the composite track rib in the wheel grooves will prevent the track from being displaced laterally to leave either of the wheels 21 if such wheels are spaced apart sufficiently to maintain the track in reasonably taut condition. Moreover, the groove of at least one wheel 21 may be formed to fit the composite rib of the track sufficiently tightly so that a tractive driving force of adequate value can be transmitted from the wheel to the track to rotate it for moving the vehicle as desired.

As the track moves circumferentially around the wheels 21, as shown in FIGURE 1, it will be evident that adjacent track sections must tilt relatively. It is preferred that the track sections be strung on the cables 4 sufficiently tightly so that the spacer members 3, even in a straight portion of the track, will be squeezed to some extent. As adjacent track sections tilt relatively in moving around the arcuate path defined by a wheel 21, the projecting portions 17 and 18 of adjacent track sections will be moved closer together to squeeze the spacer member projection 19 between them to a greater extent. Such relative tilt of the track sections will occur substantially about axes extending through the cables 4. Consequently, the flanges 13 of adjacent track sections 1 will move away from each other somewhat, but not enough to eliminate all overlapping of such flanges with the edge portions of the intermediate track sections 2.

If each track section 1 had a grouser or cleat 16, such grousers would be moved apart by tilting of the track sections as they moved from a straight path into a curved path around a wheel 21. Conversely, as the track sections pass off such a wheel, the grousers would tilt toward each other and would press dirt packed between such adjacent grousers to compact the dirt. On the other hand, as a track portion moves from ground contact upward around a wheel 21 the separating movement of the grousers 16 effected by their relative tilting would release dirt packed between the grousers to effect an automatic cleaning action of the track.

A track of the type shown in FIGURES 1 to 8, inclusive, is designed particularly for a vehicle having track-mounting wheels with grooved peripheries. A track adapted for vehicles using a drive sprocket to power the track is shown in FIGURES 9 to 16, inclusive. FIGURE 13 is a general view of the track in place on the vehicle, and FIGURE 9 is a detail view of a portion of the sprocket engaging several sections of the track. In this instance the track is composed of track sections 22 which are of identical construction but which are not symmetrical. While each end of such a track section has a cable-receiving aperture 23, one of such apertures has an access slot 24 opening at the end of the track section, while the other aperture has an access slot 25 opening at the inner side of the track section. Adjacent to the end opening access slot 24 are lugs 26 projecting oppositely from the inner side of the track section corresponding in position to the access slot 25. At the other end of the track section lugs 27 project oppositely from the end of the track section.

In stringing such track sections on cable loops 4 the alternate track sections are reversed, as shown in FIGURE 10. Thus the lugs 27 will be disposed to block the access slots 24 in the ends of the adjacent track sections. Conversely, the lugs 26 will extend into the access slots 25 at the inner sides of the adjacent track sections to block them. Such lugs, therefore, constitute substantially a completion of the cable-receiving apertures so that when the track sections are assembled into a track the apertures and lugs will form virtually a complete cylindrical passage for the cable. As in the form of track previously described, however, it is preferred that such passage be considerably larger than the cable, so that elastomer thimbles 28 encircling the cables can be inserted in such passage. Also, in the middle of each passage with an access slot 24 is an arcuate rib 24' and in the middle of each passage with an access slot 25 is an arcuate rib 25', against which ribs the adjacent ends of adjacent thimbles will abut to limit their movement into the apertures.

In the sides of the track sections adjacent to the cable-receiving apertures are recesses 29 which are of substantial extent transversely of the track, and preferably such recesses are of substantially equal depth at opposite sides of the track sections. Into these recesses may be fitted spacer blocks 30 of elastomer material, which will bridge between adjacent track sections when they are in their assembled relationship, as shown in FIGURE 12. The thickness of such spacer blocks will be somewhat greater than twice the depth of the recesses 29, and the length of the cable thimbles 28 will be somewhat greater than the distance between the rib 24' and the rib 25' of adjacent track sections. Consequently, the profile size of the spacer blocks 30 will be slightly smaller than the profile of the recesses 29, although of corresponding shape, and the outside diameter of the thimble 28 will be slightly smaller than the inside diameter of the cable-receiving aperture 23. When the adjacent track sections are forced together, therefore, the resulting squeezing of the spacer blocks 30 and thimbles 28 will cause these elements to be distended to fill and fit snugly in their corresponding recesses and apertures of the track sections.

The central portions of the track sections 22 are not symmetrical about central planes through the respective sections perpendicular to the cables 4. The central portion of each track section includes an external, convexly curved surface 31 constituting one element of a sprocket-engaging portion of the track section. Such convex surface portions of adjacent track sections cooperate to form a substantially cylindrical arcuate surface with which the recesses 32 between the teeth 33 of a sprocket 34 may engage, as shown in FIGURE 9. The central portion of each track section may also have a cavity 35 which preferably is of substantially semicylindrical shape, so that when two track sections are disposed in adjacent, mutually reversed relationship, such two cavities cooperate to form a substantially cylindrical cavity. A cylindrical key 36 may be placed in each such cavity, as shown in FIGURE 9, prior to the sections being strung on the cables. Preferably such key has a diameter slightly smaller than the diameter of the composite cavity formed by the two cavities 35, so that relative tilting movement of the adjacent track sections will not be impeded. As will be evident from FIGURE 9, however, any concentrated load imposed on one track section transversely of the track sections and the cables 4 will be transmitted to the adjacent track section by the key 36 in shear. Consequently, such key will insure that the exterior surfaces 31 are maintained in substantially the same cylindrical arc so as to fit the recesses 32 of the drive sprocket accurately.

In addition, it is preferred that the lengths of the cylindrical keys 36 be very slightly less than the lengths of the cavities 35 so as to prevent any appreciable relative lengthwise movement of the track sections between which each key bridges. Also interengagement of the lugs 26 with the access slots 25, and of the lugs 27 with the access slots 24, will resist relative lengthwise movement of adjacent track sections. Consequently, the elastomer spacer blocks 30 and the elastomer thimbles 28 will not be subjected to appreciable shear forces.

Generally centrally along the outer edge of each track section extends a cleat or grouser 37 to improve the ground-gripping ability of the track. Each of the convex sprocket-engaging surfaces 31 is shown as being faired into the central portion of a side of such grouser, so that when the track sections are assembled the two grooves 38 cooperate to form central apertures through the track, as shown in FIGURES 9, 13 and 17. Also, it is preferred that a boss 39 be provided on each track section at each side of the sprocket-engaging surface 31 for engagement with bearing and guiding rollers.

FIGURES 14, 15 and 16 show in greater detail the manner in which the assembled track is mounted on the vehicle, although the track sections are slightly modified from those shown in FIGURES 11 and 12 by the provision of lightening apertures 40 in the bottoms of the recesses 29. FIGURE 14 shows another view of the recesses 32 between the teeth 33 of sprocket 34 engaging the central portion of the track sections. FIGURE 15 shows bearing and guide rollers 41 having grooved peripheries riding on the bosses 39 at opposite sides of the sprocket-engaging surface 31 of each track section. FIGURE 16 shows the idler guide wheel 42 having an annular enlargement 43 received between the bosses 39 to prevent relative movement between such guide wheel and the track sections lengthwise of such sections while the edge portions of such idler wheel engage the bosses 39. Engagement of the track in this manner by sprocket 34, rollers 41 and idler wheel 42 will retain the track on the vehicle, transfer the load of the vehicle to the track, and transmit power to the track for moving it circumferentially.

A track composed of track sections of the type shown in FIGURES 18 to 22, inclusive, will be mounted on a vehicle in the same manner as illustrated in FIGURES 13 to 17, inclusive. Also, the central structure of the track sections shown in these figures is the same as the central structure of the track sections shown in FIGURES 9 to 12, inclusive, except for the lightening apertures 40 mentioned above. Consequently, corresponding parts of these track sections have been numbered like the track sections shown in FIGURES 9 to 12, and need not be described further. Where lightening apertures 40 are formed in the webs, however, it is preferred that shim backing plates 44 be provided to be inserted into the recesses 29, both to prevent the elastomer spacer blocks from being extruded into such lightening apertures and to enable backing plates of the desired thickness to obtain the proper spacing of adjacent track sections to be used. Such shim backing plates are shown in exploded position in FIGURE 22 and in positions assembled in recesses 29 in FIGURE 18.

While the central portions of the track sections shown in FIGURES 18 to 22, inclusive, are nonsymmetrical about a longitudinal plane perpendicular to the cables in the same respects as the track sections shown in FIGURE 11, the cable-receiving recesses 45 at the opposite ends of the track sections 46 shown in FIGURE 22 are the same. Such cable-receiving apertures have access slots 47 opening at the ends of the track sections and have arcuate ribs 47' disposed midway between the opposite ends of the cable-receiving apertures. In addition, such cable-receiving apertures have shoulders 45' remote from the respective access slots 47.

The track sections 46 will be strung on the cables 4 in the same manner as discussed in connection with the types of track section described above and as shown in FIGURES 18 and 19. It is preferred that the thimbles 48 have a central groove 48', as shown in FIGURE 22, which will deter central bulging of the thimbles when the adjacent sections are pressed together in the assembled relationship shown in FIGURE 18. As described before, the opposite ends of the thimbles 48 will bear against the arcuate ribs 47 in the cable-receiving apertures 45. In this instance, however, the track sections do not have lugs projecting laterally from them to block the access apertures in the adjacent segments. Moreover, the access apertures 47 will be in registry when the track sections are assembled as shown in FIGURES 18, 19 and 21. To string the track sections it is therefore necessary to spread apart the portions of the two cable loops to be engaged, or to insert the successive track sections between the cable portions at an angle and then swing such track sections into positions perpendicular to the planes of the cables. If the access slots 47 were not closed, therefore, it might be possible for the cables to escape from the cable-receiving apertures by spreading movement.

Retainers in the form of arcuate strip clips 49, shown best in FIGURES 21 and 22, are provided to close the access slots 47 after the cables 4 and thimbles 48 have been inserted into the cable-receiving apertures 45. Such clips are of an arcuate extent corresponding to the arc between the shoulders 45' of the cable-receiving apertures 45. When a track section 46 has been applied to the cables in a position perpendicular to their planes, therefore, before such track section is moved into a position adjacent to a strung track section and preferably before the thimbles 48 have been applied to the cables, such clips are slipped into opposite sides of the cable-receiving recesses to close the access slots 47. Such clips are preferably of a thickness equal to the circumferential width of the shoulders 45', so that the interior surfaces of such clips and the portions of the cable-receiving apertures between such shoulders will cooperate to form a continuous cylindrical surface. The thimbles 48 may then be placed over the portions of the cables at opposite sides of the track sections and slid lengthwise into the cable-receiving apertures.

As has been discussed in connection with previously described forms of the track, although the cables, spacer blocks 30 and thimbles 48 bridge between adjacent track sections, it is undesirable to rely on such elements to transmit from one track section to the next stresses exerted transversely of the cables 4. Consequently, the track sections shown in FIGURES 18 to 22, inclusive, have lugs 50 adjacent to their opposite ends, which project in planes parallel to the cables 4 and perpendicular to the general plane of the assembled track. Preferably one of these lugs is provided adjacent to each of the cable-receiving apertures 45, and the lugs adjacent to the opposite ends of each track section are respectively on opposite sides of such track sections. In the other opposite sides of such track sections are formed lug-receiving sockets 51 to receive lugs of adjacent track sections. Preferably the ends of such lugs and such sockets are rounded to enable adjacent track sections to tilt relatively to a slight degree, but such interfitting lugs and sockets will prevent appreciable relative movement of the track sections either vertically from the general horizontal plane of the track, or horizontally. Since registry of adjacent track sections is assured by the lugs 50 and sockets 51, it is unnecessary to provide a floating key interengaged between adjacent track sections like the cylindrical key 36 shown in FIGURES 9 and 11.

The type of track sections shown in FIGURES 23 and 24 in most respects is similar to the type shown in FIGURES 18 to 22, inclusive, and corresponding parts are designated by the same numbers. A track formed from such track sectons, however, need not include either the cylindrical keys 36 or the spacer blocks 30 of elastomer material bridging between them. In this instance an additional lug 52 is provided on each side of each track section, spaced toward the center of such track section from the lug 50. These lugs are adapted to fit in lug sockets 53 in the opposite sides of the track sections so as to prevent appreciable relative movement of adjacent track sections in direction tending to move lugs 50 toward each other. In the type of track composed of track sections 46, such as shown in FIGURES 8 and 22, approach movement of the lugs 50 of adjacent track sections is prevented by engagement of such lugs with the spacer blocks 30. When track sections 54 shown in FIGURE 24 tend to move so that the lugs 50 would approach each other, however, as indicated by the arrows in FIGURE 23, the lugs 52 will bear against the sides of their respect sockets 53 to limit such movement.

Actually a track could be formed from track sections such as shown in FIGURES 23 and 24 even without the lugs 50 and 52 of the elastomer spacer members 30 if floating keys 36 were inserted in the cavities 35 to bridge between the adjacent track sections. Alternatively other types of interfitting projections on adjacent track sections can be used to insure proper registery of the track sections transversely of the interconnecting cables.

In FIGURES 25 to 31 track sections are shown which are particularly suitable for heavier types of track. From one end portion of the track section body 55 project lugs 56 while lug-receiving cavities 57 are provided in opposite sides of the other end portion of each track section for the purpose of receiving such lugs. In a track composed of track sections such as shown in FIGURES 25 to 31, for example, all the track sections are the same except that alternate track sections are reversed end for end. When thus arranged the cable-receiving apertures 58 of all the track sections will be in registry parallel to the cables and the lugs of one track section will be fitted in the cavities 57 of the adjacent track sections.

The central portions of these track sections are offset as shown best in FIGURES 26 and 29 so as to be disposed closely adjacent in adjacent sections. The inner edges of the central portions of the track section are formed as curved surfaces 59 shown best in FIGURE 26 so as to provide a composite structure to fit into the recess between adjacent teeth of a driving or idler sprocket on the tractor. At opposite sides of such central portions are inwardly projecting bosses 60 which are engageable with ends of the sprockets to assist in retaining the track on the tractor. Such bosses are not located symmetrically at opposite sides of the center of the track section as will be most evident from FIGURES 25 and 29, but such bosses are offset sufficiently so that they will lie in adjacent relationship but out of registry when the adjacent track sections are assembled. Moreover such bosses are of a width parallel to the cables 4 considerably greater than the width of the rest of the track section so that the bosses of adjacent track sections will overlap when the track sections are assembled in side-by-side relationship as shown in FIGURES 26 and 29. Inter-engagement of such bosses will also function to limit relative movement of adjacent track sections transversely of the cables in one direction.

In the type of track shown in FIGURES 25 to 31 inclusive a different type of arrangement is used for securing the cables 4 in the cable-receiving apertures 58. In this instance the access slots 61 communicating with the cable-receiving apertures 58 are quite wide and such slots open at opposite ends of the track sections rather than toward the inner side of such sections. It is therefore necessary to provide reliable structure for retaining the cable in such apertures. This type of construction does, however, greatly facilitate placing the cables in the apertures through the access slots particularly when such cables are large and very stiff.

In the construction of the track illustrated in FIGURES 25 to 31, inclusive, resilient elements made of elastomer material which serve the dual function of spacer members and thimbles for the cables can be used. In fact, it is not necessary to use individual elements for each track section, but such elements can be employed in blocks of any convenient length.

In FIGURE 31 a block of rubberlike or elastomer material is shown in exploded relationship adjacent to each end of a track section. Each of these blocks has six spacer projections 62 projecting in parallel relationship from one side of the block and spaced apart a distance approximately equal to the thickness of the metal forming the cable-receiving sockets 58. At opposite sides of such sockets are recesses 63 approximately corresponding to the profile shape of the spacer member projections 62. Such spacer members will therefore fit into such recesses when the block is moved into the cable-receiving socket.

Such spacer projections 62 project from a tubular portion 64 of the block having in it a bore 65 of a size to receive a cable 4 in it, as shown in FIGURE 30. As shown in FIGURE 31, each projection is of approximately equal thickness parallel to and perpendicular to the axis of such bore. The side of the tubular portion has in it a slit 66 extending lengthwise of the block and parallel to the bore, which can be spread so as to admit a cable into such bore by relative movement of the cable and block in a direction transversely of the length of the cable. The exterior of the tubular portion 64 should be of a size and shape complemental to the track section socket 58 so that a portion of the block between spacer projections 62 will fit the cable socket snugly.

At the left of FIGURE 25 an elastomer block is shown in the position which it would occupy immediately before being moved into the access slot at the end of a track section. At the right end of FIGURE 25 a block is shown moved into assembled relationship with the track section so that a spacer member projection 62 is received in the recess 63 at each side of the track section end, and the tubular portion 64 of the block is fitted in the cable-receiving aperture 58. A retainer 67 can then be inserted behind the elastomer block to hold it in such assembled relationship. Such retainer can be applied after the elastomer block has been assembled completely with a track section, and the retainer can be disengaged from its retaining position by reverse movement.

The retainer is of generally arcuate shape and includes two fingers 68 spaced apart in generally parallel arrangement to fit in the recesses 63, respectively, on opposite sides of the cable-receiving aperture 58 so that the retainer straddles the end portion of the track section in which such aperture is formed. These fingers are somewhat curved and are tapered toward their tips so that they can be slid in wedging fashion between an elastomer spacer projection 62 and the adjacent edge of a recess 63 at each side of a track section. The central portion of the retainer has in it a notch 69 to fit a shoulder 70 in the access slot 61 communicating with the cable-receiving aperture, which shoulder faces the recesses 63. One surface of such shoulder preferably is a continuation of one side of the cable access slot, and the other surface of the shoulder is located with respect to the recesses 63 so that when the notch 69 of the retainer is engaged with the shoulder the retainer will be in its inwardly slid block-retaining position.

Because one surface of the shoulder 70 is disposed in continuation of the access slot 61 the notch 69 of the retainer is divided by a groove 71 in the center of the retainer. The portion of the track section end forming the access slot will fit into such retainer groove. Such groove has in it, however, a cavity 72 which will be spaced from shoulder 70 and a rib 73 forms one side of such cavity. This rib also is spaced from the notch 69 sufficiently to enable a hooked tool 74 to be inserted beneath the rib 73 and engaged in the cavity 72, in a manner shown in FIGURE 27, so as to enable a prying force to be applied to the retainer.

After the cable has been inserted in the bore 65 of the elastomer block and the block moved into its assembled relationship to the track section, as shown at the right of FIGURE 25, the fingers 68 of the retainer can be slid into the recesses 63 alongside the spacer projections 62. The retainer can then be struck with a hammer or mallet to drive its fingers farther to the left, as seen in FIGURE 25, until the retainer is in far enough so that the notch 69 engages the shoulder 70. When the retainer is in this position the elastomer material of the spacer members 62 should be under sufficient pressure so that the force exerted by such spacer members against the retainer 67 will hold the notch firmly in engagement with the shoulder 70. The retainer can be easily removed, however, by insertion of the hooked end of tool 74 beneath rib 73 into cavity 72 so that the shank of the tool can be swung in a direction indicated by the broken arrow in FIGURE 27 for the purpose of prying the retainer out of its block-retaining position. It will be understood that one of the retainers 67 will be thus applied to each end of each track section so as to secure each of the spacer member blocks in position at several locations.

Projecting from the outer side of each track section is a ground-engaging rib or grouser 75. While such grouser may be continuous and of uniform height from end to end of each track section, it is preferred that such grouser be omitted in the central portion of the track section. The grouser portions at opposite ends of the track section are shown in FIGURES 25 and 31 to be of unequal length, however, so that when the track is assembled with alternate sections reversed end for end, the cut-out portions will not be in registry. It has been found that this arrangement of grousers reduces the accumulation of dirt between the grousers and affords better traction for the track than where the grouser is continuous from end to end of each track section.

The track sections shown in FIGURES 32 to 34 inclusive are similar to the track sections shown in FIGURES 25 to 31 in the respect that these track sections also have oppositely projecting lugs 56' projecting from opposite sides of one end portion of each track section to fit in complemental sockets 57' of adjacent track sections, such track sections being identical and alternate track sections being reversed end for end. Also the bosses 60' projecting inwardly from the track sections at opposite sides of the sprocket-engaging surfaces 59' are arranged sufficiently off center between the ends of each track section so that when track sections are assembled in alternate end-for-end reversed relationship, as shown in FIGURE 33, such bosses will be disposed in overlapping relationship, as explained in connection with the track sections shown in FIGURES 25 to 31 inclusive.

In the track sections shown in FIGURES 32 to 34 inclusive, also, the access slots 61' communicating with the cable-receiving apertures 58' open at the ends of the track sections. Moreover, the track sections have spacer receiving recesses 63' at opposite sides of the end portions of the track sections and adjacent to the cable-receiving apertures. As in the type of track shown in FIGURES 25 to 31 inclusive, therefore, it is necessary to provide retaining means for holding the cable in the apertures 58'. In this type of construction likewise it is convenient to provide spacer member projections 62' which are integral with the thimble means 64' providing a cable-receiving bore 65'. In this instance, however, the spacer members are formed individually instead of being interconnected in a block. As shown in FIGURE 32, each projection is of approximately equal thickness parallel to and perpendicular to the axis of the thimble bore although the projection tapers somewhat from the thimble in its thickness perpendicular to the bore's axis. The combined thimble and spacer member can be applied to a cable by inserting the cable through the slit 66' communicating with the bore 65'.

The spacers as shown in FIGURE 34 simply fit between the assembled track sections and do not extend into the cable-receiving apertures 58'. Nevertheless because these spacer members are received snugly in the recesses 63' the thimble portions of the spacer members will hold the cable 4 substantially centered in the cable-receiving apertures. As the adjacent track sections are pressed toward each other the spacer members will be squeezed and consequently it is desirable to provide a shallow peripheral groove 76 in the central portion of each spacer member which will decrease in depth as the spacer members are squeezed by application of forces directed transversely of a plane parallel to such peripheral grooves.

The structure for retaining the combined spacer and thimble members in place and holding the cable in the cable-receiving apertures may be similar to that shown in FIGURES 18 to 24 inclusive. Thus depressions 77 may be provided in the portions of the walls of the recesses 63' adjacent to the ends of the track sections for the purpose of receiving arcuate strip clips 78 which will be disposed in edge-to-edge relationship as shown in FIGURE 34 when the adjacent track sections are in their assembled relationship.

As shown in FIGURE 32 each track section has a grouser 65' extending continuously along the entire length of the track section but this grouser could be interrupted like that of the track section shown in FIGURE 31 if desired. Alternatively, it would not be necessary to provide such a grouser on each track section but in that case a single type of track section could not be used. A track section of the type shown in FIGURE 32 can be used for all the track sections simply by reversing alternate track sections end for end as shown in this figure.

In the type of track section shown in FIGURES 35 to 37 inclusive the bosses 60" are similar to the bosses of the track sections shown in FIGURES 31 and 32 in that they are of a width to project beyond opposite sides of the track section. Also, such bosses are located sufficiently off center so that when the track sections are alternately reversed end for end such bosses will be located alongside each other as shown in FIGURE 36. In addition, the cable-receiving apertures 58" of this type of track section are similar to the cable-receiving apertures of the track section shown in FIGURE 32 and the cable is protected by a thimble 79 of elastomer material. This thimble can be applied to the cable by spreading a radial slit 80 in it sufficiently to receive the cable 4. Like the spacer members shown in FIGURE 32 the thimbles 79 fit between the track sections as shown in FIGURE 37. These thimbles are held in place by arcuate clips 78' which fit into recesses 77' in the track sections alongside the cable-receiving apertures 58".

While the interfitting of the bosses 60" as shown in FIGURE 36 will prevent relative lengthwise movement of track sections assembled in side-by-side relationship in one direction some provision is necessary to prevent relative lengthwise movement of these track sections in the opposite direction. Each of the track sections shown in FIGURE 35 has crossbars 81 adjacent to opposite ends of the track section respectively. These crossbars are spaced unequal distances from the opposite ends of the track section so that when two such track sections are assembled in side-by-side relationship as shown in FIGURE 6 with one track section reversed end for end with respect to the other track section such crossbars will interfit to limit relative lengthwise movement of the crossbars in the direction opposite the direction in which the bosses 60" limit relative movement of the track sections. In addition such crossbars will prevent relative lengthwise tilting of the adjacent track members and relative displacement of such adjacent track members in a direction transversely of a plane parallel to the two cables 4.

The track section of the type shown in FIGURE 35, like that shown in FIGURE 32, has a grouser 75" extending the full length of the track section but in this instance the opposite sides of the grouser form a much larger angle than the sides of the grouser 75' shown in FIGURE 32 or 75 shown in FIGURE 31. Thus it will be seen that the particular shape of the grouser may be varied considerably.

In assembling the track sections of any of the types described above on a cable loop or parallel cable loops the track sections assembled on the cable loop means may be slid into adjacent relationship until the loop is nearly filled. At some particular location in the loop the adjacent track sections will then be forced apart to pack the other track sections closely together. The last several track sections can then be inserted in the space thus formed in a comparatively loose fashion after which the pressing force can be removed so that the closeness of adjacent track sections throughout the entire loop will be equalized. The track sections can be crowded together in this fashion by utilization of one or more hydraulic jacks for example. Alternatively the track sections may be assembled on cables stretched into planar condition and then the ends of the cable means or the end track sections can be joined to form a track band.

I claim as my invention:

1. A strung section flexible band vehicle track comprising a cable, a plurality of individual track sections strung on said cable, each track section having therethrough a cable-receiving aperture and an access slot extending from such aperture lengthwise of the track section and opening through the end of such track section to receive said cable by movement transversely of its length through such access slot into such aperture, and retainer means separate from said track section engageable with said track sections for closing such access slots to prevent escape of said cable from such apertures.

2. The vehicle track defined in claim 1, in which the end portion of each track section includes a recess adjacent to the cable-receiving aperture and the retainer means includes an arcuate member fitted in such recess and blocking movement of the cable out of the cable-receiving aperture through the access slot.

3. The vehicle track defined in claim 2, in which the arcuate member includes a tapered finger wedgingly engaged between an edge of the recess in which such member is fitted and the cable for wedging the cable tightly in the cable-receiving aperture.

4. The vehicle track defined in claim 3, and a thimble of elastomer material encircling the cable within the cable-receiving aperture and engaged by the tapered finger of the arcuate member.

5. The vehicle track defined in claim 1, in which each track section has a shoulder adjacent to its cable-receiving aperture and the retainer means includes a member having a complemental notch engageable with said shoulder when the retainer member is engaged with the track section for holding the retainer member in cable-retaining position by interengagement of such notch and said shoulder.

6. The vehicle track defined in claim 5, in which the retainer member has a cavity engageable to apply a force to the retainer member for disengaging its notch from the track section shoulder in removing the retainer member.

7. A strung section flexible band vehicle track comprising a cable, a plurality of individual track sections strung on said cable, each track section having therethrough a cable-receiving aperture and an access slot extending from such aperture to the exterior of its track section for movement of said cable in a direction transversely of its length through such access slot into such aperture, and elastomer members, each including an apertured cable-embracing thimble portion encircling said cable and a track section spacer portion projecting from said thimble portion generally radially of the thimble portion aperture and engageable between adjacent track sections.

8. The vehicle track defined in claim 7, in which at least one of the track sections has a recess in its side adjacent to its cable-receiving aperture for receiving the spacer projection of the elastomer member.

9. A combined cable thimble and track section spacer member of elastomer material for use in a strung section flexible band vehicle track, comprising in combination with cable means, a thimble having a cable-receiving aperture therethrough and a track section projection integral with said thimble projecting from said thimble generally radial of said thimble's cable-receiving aperture and of approximately equal thickness parallel to and perpendicular to the axis of said aperture and tapering from the thimble in its thickness perpendicular to the bore's axis.

10. A combined cable thimble and track section spacer member of elastomer material comprising a tubular cable-receiving thimble portion and a plurality of spacer projections projecting in spaced, substantially parallel relationship from said tubular portion and extending generally radially of the bore through said thimble portion.

11. A strung section flexible band vehicle track comprising cable means extending circumferentially of the vehicle track, and track means including a plurality of individual track sections strung on said cable means, all of said track sections being identical but each being non-symmetrical about a central plane extending transversely of its length midway between its ends, and alternate track sections being reversed end for end relative to the track sections between such alternate track sections.

12. The vehicle track defined in claim 11, in which each track section has a projection projecting from it transversely of the length of the track section and engageable with an adjacent track section to limit relative movement of such track sections.

13. The vehicle track defined in claim 12, in which the projection is a boss projecting from the inner side of each track section and the adjacent track section also has an inwardly projecting boss engageable with the first boss.

14. The vehicle track defined in claim 12, in which the projection is a lug projecting from a side of the track section generally parallel to the cable means and the adjacent track section has a socket in which the lug fits.

15. The vehicle track defined in claim 12, in which the projection is a crossbar extending generally parallel to the cable means and the opposite ends of the crossbar project beyond opposite sides of the track section.

16. A strung section flexible band vehicle track comprising cable means extending circumferentially of the vehicle track, and track means including a plurality of individual track sections strung on said cable means, each of said track sections having projections, each of said projections having their ends each extending on opposite sides of the track section and engageable with adjacent track sections, the distances between each projection and the proximate end of the track section being unequal.

17. The vehicle track defined in claim 16, in which all the track sections are identical and alternate track sections are reversed end for end with respect to the track sections between such alternate track sections.

18. A strung section flexible band vehicle track comprising cable means extending circumferentially of the vehicle track, and track means including a plurality of individual track sections strung on said cable means, each of said track sections having a pair of bosses projecting inwardly therefrom transversely of the length of the track section, each of said bosses having their ends each extending on opposite sides of the track section, the distances between each boss and the proximate end of the track section being unequal, the bosses of each track section engaging corresponding bosses of adjacent track sections.

19. A track section for a strung section flexible band vehicle track comprising a body having a plurality of parallel cable-receiving apertures extending therethrough and a plurality of generally parallel bosses projecting from said body transversely of its length and generally parallel to the axes of such cable-receiving apertures, each of said bosses having their ends each extending on opposite sides of said body, the bosses of said pair being located in spaced relation lengthwise of said body, and the distances between each boss and the proximate end of said body being unequal.

20. The track section defined in claim 19, in which the body has between its spaced bosses a surface shaped for engagement with the recesses between the teeth of a track-engaging sprocket.

21. A track section for a strung section flexible band vehicle track comprising a body having a plurality of substantially parallel cable-receiving apertures therethrough and a pair of crossbars extending generally parallel to the plane including the axes of said cable-receiving apertures, each of said crossbars having their ends each extending on opposite sides of the body, the crossbars of said pair being located in spaced relationship lengthwise of said body and the distances between each crossbar and the proximate end of the body being unequal.

22. A track section for a strung section flexible band vehicle track comprising a body having a plurality of generally parallel cable-receiving apertures extending therethrough and having projections extending generally parallel to the plane including the axes of such cable-receiving apertures, which projections are substantially aligned in a line parallel to such plane and project from opposite sides of said body, said projections being located closer to one end of said body than to its other end, said body having sockets of a size and shape complemental to the size and shape of said projections located substantially in alignment along a line substantially parallel to such plane and at a distance from one end of said body approximately equal to the distance of said projections from the other end of said body.

23. A strung section flexible band vehicle track comprising cable means extending circumferentially of the vehicle track, and track means including a plurality of individual track sections strung on said cable means, all of said track sections being identical and alternate track sections being reversed end for end with respect to the track sections between said alternate track sections, and each of said track sections having a lug projecting from a side thereof and located closer to one end of the track section than to its other end, and each of said track sections having in the side thereof a socket in which such a lug of an adjacent track section is fitted.

24. The vehicle track defined in claim 23, in which each of the track sections has two lugs projecting oppositely from opposite sides thereof and disposed substantially in alignment along a line substantially parallel to the cable means and each of the track sections has lug-receiving sockets in opposite sides thereof in which lugs of adjacent track sections are fitted.

25. A track section for a strung section flexible band vehicle track comprising a body having therethrough a plurality of substantially parallel cable-receiving apertures, and grouser means on the outer side of said body, extending lengthwise thereof and including two parts respectively adjacent to the opposite ends of said body which grouser parts are of unequal extent lengthwise of said body.

26. A strung section flexible band vehicle track comprising cable means extending circumferentially of the track, a plurality of individual track sections strung on and connected by said cable means in side-by-side relationship, adjacent sides of adjacent sections having therein matching recesses opening toward each other, and registering means received in such recesses and bridging between such adjacent track sections for transmitting between such adjacent track sections stress acting transversely of the length of said cable means.

27. A strung section flexible band vehicle track comprising two endless cable loops disposed in registry with each other in parallel planes, a multiplicity of individual track sections disposed in side-by-side relationship and strung on and connected by said cable loops, each track section being of greater length than width, disposed with its length extending transversely of said cable loops, having portions spaced lengthwise thereof engaged, respectively, with said cable loops and maintaining said cable loops in spaced relationship, and registering means bridging between adjacent track sections, said registering means extending along substantially the entire length of said section on at least one side thereof, rockably engageable with at least one of such track sections to enable said track sections to tilt relatively while transmitting between such track sections stress acting lengthwise of said track sections and transversely of the portions of said cable loops engaged by said adjacent track sections.

28. A strung section flexible band vehicle track comprising two endless cable loops disposed in registry with each other in parallel planes, a multiplicity of individual track sections disposed in side-by-side relationship and strung on and connected by said cable loops, each track section being of greater length than width, disposed with its length extending transversely of said cable loops, having portions spaced lengthwise thereof engaged, respectively, with said cable loops and maintaining said cable loops in spaced relationship, and registering means carried by each of said track sections and rockably engageable with an adjacent track section to enable said track sections to tilt relatively while transmitting between such track sections stress acting lengthwise of said track sections and transversely of the portions of said cable loops engaged by the track section carrying the particular registering means, said registering means extending along substantially the entire length of said section on at least one side thereof.

29. A strung section flexible band vehicle track comprising two endless cable loops disposed in registry with each other in parallel planes, a multiplicity of individual track sections disposed in side-by-side relationship and strung on and connected by said cable loops, each track section being of greater length than width, disposed with its length extending transversely of said cable loops, having portions spaced lengthwise thereof engaged, respectively, with said cable loops and maintaining said cable loops in spaced relationship, and a multiplicity of elastomer members, each fitted between adjacent track sections and cushioning relative approach movement thereof.

30. The vehicle track defined in claim 29, and a multiplicity of rigid registering elements engaged with and bridging between adjacent track sections and transmitting between such adjacent track sections stress acting transversely of the portions of the cable loops engaged by such track sections.

31. The vehicle track defined in claim 30, in which each rigid registering element is integral with one track section and engaged with an adjacent track section.

32. The vehicle track defined in claim 30, in which adjacent track sections have matching recesses opening toward each other, and each rigid registering element is a floating key separate from the adjacent track sections, received in such matching recesses of such adjacent track sections and bridging between such adjacent track sections.

33. The vehicle track defined in claim 29, in which adjacent sides of adjacent track sections have therein matching recesses opening toward each other, and the elastomer members are received in such matching recesses and bridge between the adjacent track sections in which such recesses are provided.

34. A strung section flexible band vehicle track comprising a cable, and a plurality of individual track sections disposed in side-by-side relationship, each track section being of greater length than width, disposed with its length extending transversely of said cable and having therethrough a cable-receiving aperture and an access slot communicating with such aperture and opening at the end of said track section for engagement of said cable in such cable-receiving aperture by movement of said cable transversely of its length through such access slot into such aperture, the access slot of one of two adjacent track sections being out of registry circumferentially of the cable with the access slot of the other of such adjacent track sections to deter movement of said cable out of the cable-receiving apertures of such adjacent track sections.

35. The vehicle track defined in claim 34, and slot-closing means disposed in position closing the access slot of at least one of the cable-receiving apertures after the cable has been lodged therein.

36. The vehicle track defined in claim 35, in which the slot-closing means includes a lug carried by one of the two adjacent track sections and projecting laterally therefrom into a position blocking the access slot of the other of such adjacent track sections.

37. The vehicle track defined in claim 34, in which one of the two adjacent track sections has its access slot at the inner side of an end portion of such track section, and a lug projecting from the end of such track section lengthwise of the track and blocking the access slot in the end of the adjacent track section.

38. The vehicle track defined in claim 37, in which a track section having an access slot opening at the end of the track section has a lug projecting from the inner side of the end portion of such track section in a direction lengthwise of the track and blocking the access slot at the inner side of an adjacent track section.

39. A strung section flexible band vehicle track comprising a cable, a plurality of individual track sections strung on said cable, each track section having therethrough a cable-receiving aperture and an access slot extending between such aperture and the track section exterior for engagement of said cable in such cable-receiving aperture by movement of said cable transversely of its length through such access slot into such aperture, and resilient thimble means of elastomer material embracing said cable and fitted between the cable-receiving aperture of each track section and the portion of the cable passing therethrough and bridging between adjacent track sections.

40. A strung section flexible band vehicle track comprising a multiplicity of individual track sections disposed in side-by-side relationship, each track section being of greater length than width, cable means having its length extending transversely of the lengths of said track sections, extending through said track sections and interconnecting them, each of said track sections having a registering lug projecting therefrom toward and engaged with the adjacent track section for transmitting between such track sections stress acting lengthwise of said track sections and transversely of said cable means and relieving said cable means of such stress, said registering lug extending along substantially the entire length of each of said sections on at least one side thereof.

41. A strung section flexible band vehicle track comprising cable means extending circumferentially of the vehicle track, and track means including a multiplicity of individual track sections disposed in side-by-side relationship, each track section being of greater length than width, disposed with its length extending transversely of the length of said cable means and strung on said cable means, a multiplicity of said track sections being disposed in pairs, the track sections of each pair having complemental convex sprocket-engaging portions disposed in adjacent relationship for cooperative engagement with a valley between adjacent sprocket teeth.

42. A strung section flexible band vehicle track comprising cable means extending circumferentially of the track, and track means including a multiplicity of individual and separate track sections strung on said cable means in side-by-side relationship connected only by said cable means, and spacer members of deformable elastomer material interposed between adjacent track sections, said track sections being relatively slidable along said cable means to vary the spacing of adjacent ones of said track sections and to squeeze the members of elastomer material between them.

43. A strung section flexible band vehicle track comprising cable means extending circumferentially of the track, a plurality of individual track sections strung on said cable means in side-by-side relationship, adjacent sides of adjacent track sections having therein matching recesses opening toward each other, and an elastomer member having portions received in such recesses and bridging between such adjacent track sections for cushioning relative movement thereof.

44. A strung section flexible band vehicle track comprising a cable, two adjacent track sections strung on said cable, each track section having therethrough a cable-receiving aperture with a circumferentially extending offset in its periphery, and resilient thimble means of elastomer material embracing said cable, having portions spaced lengthwise of said cable fitting the cable-receiving aperture of each track section including its offset and bridging between said adjacent track sections, engagement of said thimble means with offsets of such apertures resisting movement of said thimble means lengthwise of the cable relative to such apertures.

45. A strung section flexible band vehicle track comprising cable means extending lengthwise of the track, two adjacent track sections strung on said cable means, one of said track sections having therein a recess opening toward the other track section, and an elastomer member having a portion fitted snugly in such recess and engaging the bottom thereof and a portion projecting from such recess and engaging the other track section for cushioning and limiting relative approach movement of said track sections.

46. A strung section flexible band vehicle track comprising cable means extending lengthwise of the track, two adjacent track sections strung on said cable means, and an elastomer member having oppositely facing portions bearing respectively on facing portions of said adjacent track sections for cushioning and limiting relative approach movement of said track sections.

References Cited in the file of this patent

UNITED STATES PATENTS

| | | |
|---|---|---|
| 1,230,504 | Nelson | June 19, 1917 |
| 1,956,472 | Penn | Apr. 24, 1934 |
| 1,970,756 | Lamb | Aug. 21, 1934 |
| 2,063,762 | Schultz | Dec. 8, 1936 |
| 2,402,042 | Haushalter | June 11, 1946 |
| 2,845,308 | Woltemar | July 29, 1958 |